Feb. 20, 1968   A. JORDAN   3,369,529
ROTARY INTERNAL COMBUSTION ENGINE
Filed Jan. 3, 1967   6 Sheets-Sheet 3

Fig. 5

Inventor:
Alfred Jordan
by
Michael S. Striker
Attorney

Fig. 6

Inventor:
Alfred Jordan
by Michael S. Striker
Attorney

Fig. 7

Inventor:
Alfred Jordan
By Michael S. Striker

Feb. 20, 1968          A. JORDAN          3,369,529
              ROTARY INTERNAL COMBUSTION ENGINE
Filed Jan. 3, 1967                    6 Sheets-Sheet 6

Inventor:
Alfred Jordan
by Michael S. Striker
    Attorney

United States Patent Office 3,369,529
Patented Feb. 20, 1968

3,369,529
ROTARY INTERNAL COMBUSTION ENGINE
Alfred Jordan Drususstrasse 25, Bonn, Germany
Continuation-in-part of application Ser. No. 371,271, June 1, 1964. This application Jan. 3, 1967, Ser. No. 607,359
Claims priority, application Germany, Sept. 29, 1966, J 31,879
22 Claims. (Cl. 123—8)

ABSTRACT OF THE DISCLOSURE

A rotary internal combustion engine mainly comprising a housing having an annular central section having an internal surface of oval outline, and a pair of side walls connected to opposite ends of the central section of the housing. A shaft is coaxially journalled in the sidewalls and extends into the interior of the housing. Four pistons are arranged in the central section of the housing and each of the pistons has an outer surface facing the internal surface of the housing and a trailing end adjacent the leading end of the next following piston. Means are provided for articulatingly connecting the ends of the pistons to each other so that the pistons form a linked quadrangle and seals are provided between the corners of the quadrangles and the internal surface of the housing. The engine includes further four radially extending collapsible and extensible arm means fixedly connected at the inner ends thereof to the aforementioned shaft for rotation therewith, and at the outer ends to the corners of the quadrangle. The engine is air cooled and the pistons are connected to each other and to the shaft in such a manner to impart to the shaft a substantially uniform rotary speed during operation of the engine.

Cross-references to a related application

The present application is a continuation-in-part application of the application filed June 1, 1964 under the Ser. No. 371,271 and entitled "Rotary Piston Apparatus."

Background of the invention

The present invention relates to rotary internal combustion engines, and more specifically to air cooled rotary piston motors supplied with a gas-air mixture, or to an air-cooled rotary diesel motor.

Rotary internal combustion engines are known in the art and for instance disclosed in the U.S. patent application 371,271 and the rotary internal combustion engine may include, as disclosed in this application, a housing having an internal surface of oval configuration and four pistons arranged within the housing and each having a trailing end closely adjacent the leading end of the next following piston and articulately connected thereto by means of a substantially half cylindrical sealing member in sealing and sliding contact with the internal surface of the housing. In this arrangement a shaft extends centrally through the housing and the pistons are connected to the shaft by means of radial arms which at the outer ends thereof are pivotally connected to the respective pistons substantially midway between the opposite ends thereof.

This known construction has the disadvantage that the pistons which are pivotally connected substantially midway between the ends thereof to the respective outer ends of the arms have to carry out, while moving along portions of the oval internal surface of the housing having greater radii of curvature than other portions thereof, a tilting movement, which takes a longer time, than the tilting movement the pistons will make during movement along surface portions of the housing having a smaller radius of curvature. This will result in a non-uniform rotary movement of the shaft connected by the arms to the pistons and a flywheel mass has therefore to be connected to the shaft to at least partly equalize the non-uniformity of its rotation. Furthermore, this arrangement requires also that one of two pairs of oppositely arranged arms which carry the pistons cannot be fixedly connected to the shaft, but one of the pairs of arms has to be connected to the shaft movable with respect thereto, so that two arms will not transmit a turning moment to the shaft.

It is an object of the present invention to overcome this disadvantage of the aforementioned internal combustion engine according to the prior art and to provide for an internal combustion engine in which the pistons are connected to each other and to the shaft in such a manner to produce a uniform rotation of the shaft without requiring additional flywheel masses.

It is an additional object of the present invention to provide an internal combustion engine which not only produces a uniform rotation of the shaft, but which is also constructed in such a manner to provide for proper cooling of the pistons and other elements of the combustion engine.

Summary of the invention

With the above objects in view, the rotary internal combustion engine according to the present invention mainly comprises a housing having an annular central section having an internal surface of oval outline and a pair of side walls connected to opposite ends of the central section, a shaft coaxially journalled in and extending into the interior of the housing, a plurality of pistons having each a wall portion facing the internal surface of the housing and a trailing end adjacent to the leading end of the next following piston, combined sealing and linkage means interposed between the trailing end of each piston and the leading end of the following piston and articulatedly connecting the ends of the pistons to each other, each of the combined sealing and linkage means being in sealing contact with the respective piston ends and with the internal surface of the housing, and a plurality of arm means fixedly connected at the inner ends thereof to the shaft for rotation therewith and each carrying a respective one of the combined sealing and linkage means movable toward and away from the axis of the shaft.

Preferably, the internal combustion engine includes four pistons of equal length which are arranged in the housing so as to form an equilateral linked quadrangle, and the combined sealing and linkage means may comprise rollers having axes extending substantially parallel to the axis of the shaft and respectively passing through the corners of the aforementioned quadrangle. The arrangement is made in such a manner that each of the pistons will during rotation of the shaft tilt about its center of gravity and the centers of gravity of all pistons will move during rotation of the shaft about a common circle coaxial with the axis of the shaft.

Each of the aforementioned arm means preferably includes an inner arm portion fixedly secured to the shaft and an outer arm portion slidingly connected to the inner arm portion and movable toward and away from the shaft axis, whereas the aforementioned rollers are respectively connected to the outer arm portions. Preferably the arm means extend in substantially radial direction from the shaft and the rollers are respectively fixedly connected to the outer free ends of the outer arm portions. A plurality of arm means may be connected to each of the rollers spaced in direction of the axis of the latter from each other and the plurality of arm means of each roller may be connected to each other by a bolt extending substantially parallel to the axis of the respective roller and connecting the outer arm portions of the plurality of arm means for each roller to each other. The arrangement may also include a plurality of link members each formed with a pair of bores respectively located in the region of opposite ends of the link member through which the aforementioned bolts respectively extend.

In order to improve the guiding of the rollers which articulately connect adjacent ends of the pistons to each other, which are hereafter also called linkage rollers and to improve the seal of the combined sealing and linkage means, the latter may include in addition to the aforementioned linkage roller a sealing roller of smaller diameter than the linkage roller and the sealing roller is eccentrically mounted in the linkage roller and is in sealing contact with the internal surface of the housing. The sealing roller is flattened on the side thereof engaging the oval internal surface of the housing and a pair of sealing strips are slidably arranged in guide slots extending inwardly from the flattened face of the sealing roller. The sealing strips have outer edges in sealing contact with the internal surface of the housing. Similar sealing strips may be slidably guided in guide slots extending in longitudinal direction of the linkage roller and respectively engaging along outer edges thereof the peripheral surface of the sealing roller. In order to improve the connection between the ends of the piston and the linkage roller located therebetween, each piston end may be provided with a plurality of comb-like arranged fingers partially extending about the peripheral surface of the linkage roller, and the fingers on the end of one piston are axially displaced and located between the fingers on the adjacent end of the following pistons.

The specific surface pressure at the moment of ignition of the fuel-air mixture in the space between the internal surface of the housing and the wall of one piston facing the surface is reduced with the arrangement of the present invention in which at the moment of ignition the pistons adjacent the one piston are substantially normal to the one piston so that the explosion forces acting on the one piston are transmitted through the adjacent pistons to the piston opposite the one piston. Furthermore, the inwardly directed forces produced in the combined linkage and sealing means on the one piston under which the explosion occurs are transmitted through the link members and bolts to all of the combined sealing and linkage means so that a uniform force transmission will take place. Since the outer arm portions to which the combined sealing and linkage means are connected are movable in radial direction with respect to the inner arm portions which are fixed to the shaft, no bending forces will be transmitted to the shaft so that the latter will be stressed only by torsional forces. The arrangement is further made in such a manner that the centers of gravity of the four pistons of equal weight will move during operation of the internal combustion engine along a common circle and will act therefore as a flywheel mass so that a separate flywheel connected to the shaft is not necessary. The centrifugal forces acting on the four pistons are directed against each other so that no centrifugal forces will be transmitted to the bearings on which the shaft is mounted. A uniform tilting of the pistons about their centers of gravity is enforced by the sliding of the sealing rollers along the internal oval surface of the housing and in this arrangement the inner arm portions of all arm means may be fixedly connected to the shaft for rotation therewith so that each of the pistons will transmit a turning moment to the shaft. If two, four piston arrangements of the aforementioned kind are located next to each other connected to a single shaft, the smooth rotation of the shaft can be further improved by displacing the two housings through 90° with respect to each other.

Since a separate flywheel is not necessary with the arrangement according to the present invention the axial length of the rotary internal combustion engine can be held relatively short, and the cost of manufacturing and assembly of the various parts of the rotary internal combustion engine according to the present invention is reduced due to the symmetrical arrangement of the engine and due to the identical configuration of pistons and elements connected thereto.

The rotary internal combustion engine according to the present invention is also constructed to provide a perfect cooling of the engine during operation thereof. If the engine is used as a stationary engine, the side walls of the housing are preferably formed with central openings, and an air stream is sucked in axial direction through the openings, by a radial fan connected to the shaft of the engine and located outside and next to one of the side walls. A cool air stream passes thus in axial direction through the interior of the housing and in order to provide for a most efficient cooling of the pistons, the latter are provided with a plurality of cooling ribs extending toward the shaft so that the air stream passing in axial direction through the central portion of the housing will flow about the cooling ribs on the pistons and provide for an increased heat exchange between pistons and the cool air stream. The air passing in axial direction through the center portion of the housing is deflected by the radial fan and appropriate air guiding surfaces so as to pass in opposite direction about outer cooling ribs projecting from the annular center section of the housing. The central section of the housing may include an inner mantle having the aforementioned internal oval surface and an outer mantle radially spaced over a major portion thereof from the inner mantle to form between the outer surface of the inner mantle and the inner surface of the outer mantle axially extending air passage means through which the air stream deflected by the fan and the air guiding surfaces will pass. The outer mantle is preferably in the form of a hollow circular cylinder eccentrically arranged with respect to the inner mantle in such a manner that the inner mantle merges with the outer mantle in the region in which during operation of the engine the inner mantle has its coolest zone, whereas in the region of the hottest zone of the inner surface the outer surface of the inner mantle is farthest from the inner surface of the outer mantle and the surfaces are connected to each other by a plurality of cooling ribs to assure in this zone an increased heat exchange between the cooling air and the inner mantle.

When the engine according to the present invention is used to drive for instance a vehicle, the housing will be cooled at the outside thereof by the air stream passing around the housing during movement of the vehicle. In this case it may be preferred to omit the central openings in the side walls of the housing and to construct the side walls as smooth uninterrupted walls which may be used to mount thereon additional drive apparatus for the vehicle. In order to assure in this case a proper cooling of the pistons and of the other elements of the rotary internal combustion engine, two of the pistons are constructed as cooling pistons and provided with openings in a central part of the wall portion thereof facing the internal oval surface of the housing. In this case entrance of combustion air into the chambers of the working pistons and entrance of cooling air beneath the cooling pistons occurs through a suction passage and discharge of the combustion gases and the heated cooling air will occur through a discharge passage. When the opening of one of the cooling pistons is located opposite the suction passage cooling air will pass in the space between the internal surface of the housing and the wall portion of the cooling piston facing this internal surface and through the opening in the wall portion into the central portion of the housing, while the cool air in the aforementioned space will pass during rotation of the pistons along the internal surface of the housing and cool the surface to be finally expelled through the discharge passage. The amount of air expelled through the discharge passage can be increased by providing air guide surfaces in the openings of the cooling systems which extend spaced from each other and transverse to the direction of movement of the piston. Cooling of the side walls of the housing is obtained by the cooling pistons by providing a small space between the outer surfaces of the side walls of the cooling pistons and the inner surfaces of the side walls of the housing. During rotation of the pistons the side walls thereof and the side walls of the housing will be cooled by the cooling air passing through the aforementioned space. The suction and discharge passage communicate with the interior of the housing at a portion thereof in which the oval internal surface has a large diameter of curvature, and the explosion of the fuel gas mixture beneath the working pistons of the arrangement takes place at an opposite wall portion of the housing in which the inner surface has also an equal large radius of curvature. The outer surface of each cooling piston has a radius of curvature substantially equal to that of the large radius of curvature of the housing so that during rotation of the pistons the outer surface of each cooling piston will come over the whole area thereof in contact with or be at least very close to the hotest zone of the internal surface of the housing whereby cooling air will be pressed by the remaining outer surface portion of the cooling piston against the internal surface of the housing and part of the cooling air displaced will also be pressed through the space between the side walls of the cooling piston and the side walls of the housing. The air guide surfaces arranged transversely to the movement of the cooling pistons will assure a continuous suction of the hot air accumulating in the central portion of the housing out of the latter during the movement of the respective cooling piston past the discharge opening whereby the hot air will be discharged through the discharge opening into the atmosphere.

The cooling piston arrangement can also be combined with a cooling arrangement in which cooling air is sucked in axial direction through the central portion of the housing. An axial stream of cooling air may also be used without difficulties in an arrangement in which two sets of rotating pistons are arranged adjacent each other and in which the two housings are separated from each other by a common side wall. In this case the common shaft for both sets of pistons is preferably supported in a bearing mounted in the common side wall, but this bearing mounting may be constructed in such a manner that openings are provided at opposite sides of the bearing through which a substantially axial stream of cooling air may pass from the interior of one housing into the interior of the housing next thereto.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

*Brief description of the drawings*

Substantially identical elements performing the same functions are referred to in the various figures with identical reference numerals.

*Description of the preferred embodiments*

Figure 4:
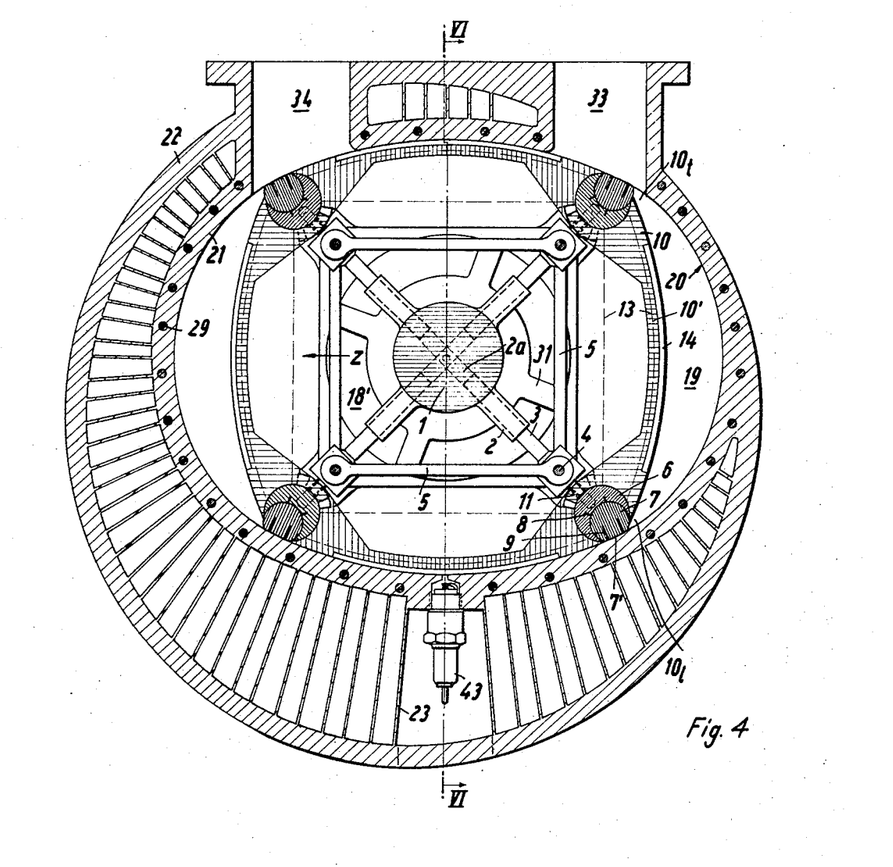
FIG. 4 is a transverse cross section through one embodiment of the rotary internal combustion engine according to the present invention, the section being taken along line IV—IV of FIG. 6.
Figure 6:
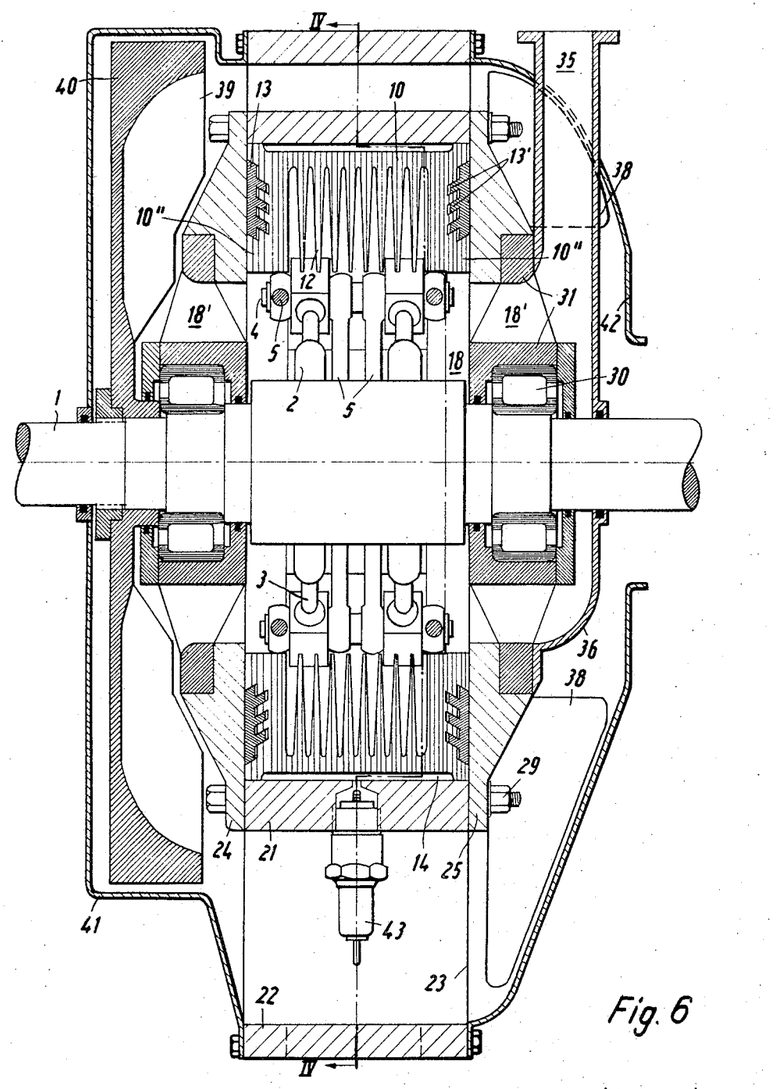
FIG. 6 is an axial cross section of the embodiment shown in FIG. 4, the section being taken along the line VI—VI of FIG. 4.
Figure 12:
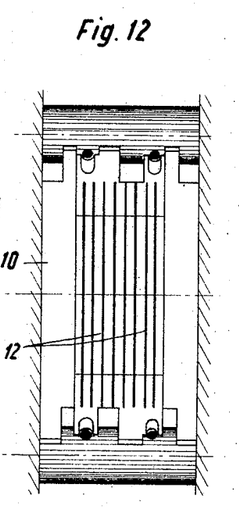
FIG. 12 is an end view of one of the pistons shown in FIG. 4 taken in direction of the arrow Z in FIG. 4.

Referring now to the drawings, and more specifically to FIGS. 4, 6 and 12 in which one embodiment of a rotary internal combustion engine according to the present invention is illustrated, it will be seen that the engine may include a housing having an annular central section formed by an inner mantle 21 having an inner surface 20 of oval outline and an outer mantle 22 preferably in the form of a hollow circular cylinder arranged eccentrically with respect to the inner mantle 21. The housing includes further a pair of side walls 24 and 25 (FIG. 6) connected to opposite ends of the central section by a plurality of screw means 29 extending through aligned bores in the side walls and the inner mantle 21 of the central section. A shaft 1 extends through central openings in the side walls of the housing and is turnably mounted in anti-friction bearing 30 which may for instance be roller bearings which in turn are connected by bearing flanges 31 to the side walls of the housing in such a manner that the axis of the shaft extends along the intersection line of the two planes of symmetry of the oval internal surface 20 of the housing. The bearing flanges 31 are constructed in such a manner that air can pass in axial direction through the openings 18' in the bearing flanges for a purpose which will be explained later on. Four pistons 10 are arranged in the interior of the central section of the housing and each piston has a wall portion 10' facing the internal surface 20 of the central section of the housing and the wall portion 10 has an outer surface forming part of a cylindrical surface with a radius of curvature substantially identical to the maximum radius of curvature of the internal surface 20 of the central section of the housing. During operation of the engine in the manner as will be described later on, the pistons will move in clockwise direction and each of the pistons 10 has a leading end portion $10_1$ adjacent to the trailing end portion $10_t$ of the next following piston. The leading end $10_1$ of one piston is articulately connected to the trailing end $10_t$ of the piston adjacent thereto by combined sealing and linkage means which preferably comprise a linkage roller 6 having an axis substantially parallel to the axis of the shaft 1 and extending transversely through the central section of the housing and engaging with the peripheral surface thereof correspondingly curved faces formed at the leading and trailing ends of the pistons. Each of the pistons is provided at its leading and its trailing end with a plurality of comb-like arranged fingers 11 which extend over a portion of the peripheral surface of the linkage roller 6, and the fingers 11 on the trailing end on one piston are axially displaced with respect to the fingers on the leading end of the piston adjacent thereto. Each of the combined sealing and linkage means preferably comprises also a sealing roller 7 tiltably mounted in a corresponding cylindrical cavity of the respective linkage roller 6 and having an axis parallel to the axis of the linkage roller and eccentrically arranged with respect thereto. The axes of the rollers 6 and 7 are arranged in such a manner that a radial line passing through the axis of the shaft and that of the roller 6 passes also through the axis of the sealing roller 7. The sealing roller 7 has a flattened side face 7' in sliding engagement with the internal surface 20 of the housing and this slide face intersects in a plane normal to the axis of the sealing roller the circular contour of the latter along a straight line outwardly spaced from the center thereof. A pair of sealing strips 9 are slidably arranged in slots extending inwardly from the slide face 7' of the sealing roller so that during fast movement of the latter along the internal surface 20 of the housing the outer edges of the sealing strips 9 are pressed by centrifugal forces against the internal surface 20. Similar sealing strips 8 are arranged in guide slots of the linkage roller which extend radially towards the axis of the sealing roller so that the outer edges of the sealing strip 8 will engage the peripheral surface of the sealing roller 7.

Arm means are provided for connecting the combined linkage and sealing means 6, 7 to the shaft 1 for rotation therewith and for movement toward and away from the shaft axis. Each of the arm means comprises an inner arm portion 2 fixedly connected to the shaft 1 and extending radially from the latter and each being formed with a bore 2a therethrough which is continued to the center of the shaft, and an outer arm portion 3 slidably guided in the bore 2a. The outer end of each arm portion 3 is provided with a screw thread threading engaged in a corresponding bore of the respective linkage roller 6. Preferably, at least two arms 2, 3 are provided for each linkage roller 6 which are arranged spaced from each other in direction of the axis of the latter. The outer portions 3 of all of the arm means are connected to each other by link members 5 formed at opposite ends thereof with bores therethrough through which bolts 4 respectively extend pivotally connecting the ends of the link members 5 to reinforced portions of the outer arm portions 3. The distances between the bores at opposite ends of the link members 5 are equal for all of the link members so that the latter form equilateral quadrangles articulately connected at the corners thereof by the bolts 4.

Each of the pistons 10 has a pair of side walls 10" (FIG. 6) respectively facing the side walls 24 and 25 of the housing. An elongated sealing strip 13 engaging with opposite curved ends thereof the respective linkage rollers 6 is located in a corresponding groove of each side wall 10". Each of the sealing strips 13 is provided with a plurality, for instance 3, elongated ribs 13' extending from the rear face of the sealing strip inclined with respect thereto and being guided in corresponding slots of the respective side wall 10" of the piston. The guide slots in the side walls of the piston and the ribs 13' are inclined in such a manner that the outer ends of the guide slots and ribs are spaced further from the axis of the shaft 1 than the inner ends thereof so that during movement of the pistons centrifugal forces will be created pressing the outer face of each sealing strip 13 against the opposite face of the corresponding side wall of the housing. Each of the pistons 10 is further provided with a plurality of cooling ribs 12 arranged closely spaced from each other between the side walls 10" of the piston. The wall portion 10' of each piston is formed intermediate its ends with an elongated shallow cavity 14 facing the internal surface 20 of the housing.

The central section of the housing is further provided with suction passage means 33 and discharge passage means 34 which are respectively arranged symmetrically with respect to one plane of symmetry of the internal surface 20 on one side of the latter which has a large radius of curvature. A spark plug 34 is arranged in this plane of symmetry on the opposite side of the housing in a corresponding bore of the inner mantle 21.

Figure 10:
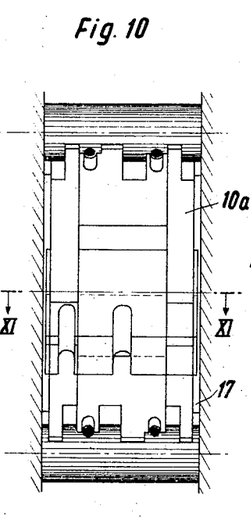
FIG. 10 is an end view of one of the cooling pistons shown in FIG. 5, the view is taken in direction of the arrow Y of FIG. 5.

The embodiment of the rotary internal combustion engine according to the present invention illustrated in FIGS. 4, 6 and 10 includes further a fan 40 coaxially arranged with and fixedly connected to the shaft 1 for rotation therewith closely adjacent to the left bearing 30, as viewed in FIG. 6. The fan 40 has a plurality of radially extending fan blades 39 constructed in such a manner so as to suck cooling air through the openings 18' in the right bearing flange 31, as viewed in FIG. 6, into the interior 18 of the central section of the housing and the air passes then through corresponding openings 18' in the left bearing flange 31 and is deflected by the fan blades to pass through the air passage means formed between the cooling ribs 23 which connect the inner mantle 21 to the outer mantle 22. A sheet metal cover 41 surrounding the fan 40 and connected by screws or the like to the outer mantle 22 helps to deflect the air passing through the fan into the aforementioned air passages. A substantially bell-shaped metal sheet 42 is connected by screws or the like to the other side of the outer mantle 22 to guide the air emanating from the right side, as viewed in FIG. 6, of the aforementioned air passages along the outer surfaces of the side wall 25 and the air can finally escape through a central opening of the bell-shaped cover 42. A plurality of radial cooling ribs 38 project preferably from the outer surface of the side wall 25, and these cooling ribs also enhance heat exchange between the cooling air and the side wall 25.

Figure 1:
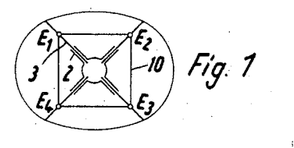
FIGS. 1 and 2 are schematic views illustrating the lateral linked quadrangle formed by the pistons, respectively in two through 45° displaced positions.
Figure 2:
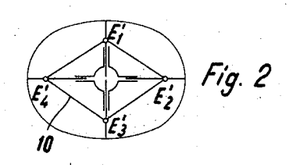
Figure 3:
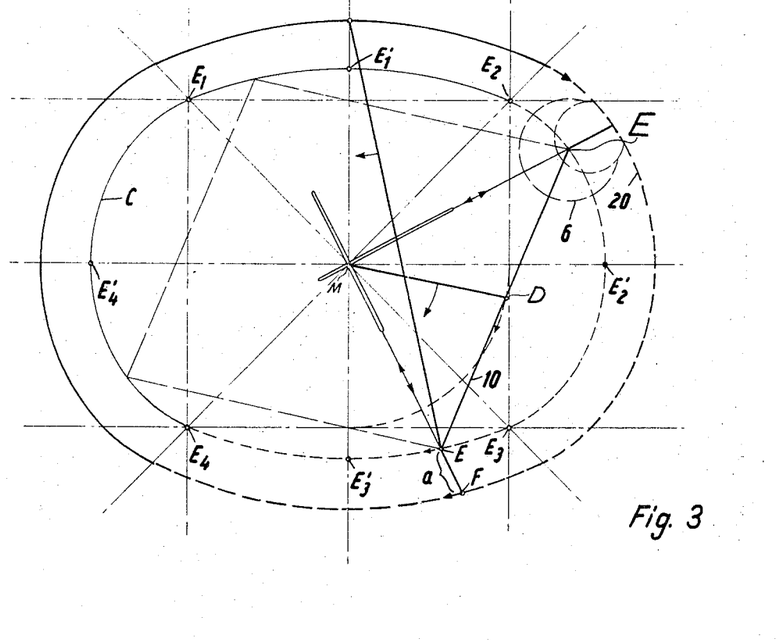
FIG. 3 is a schematic view illustrating the construction of the internal surface of the housing according to the present invention.

FIGS. 1 and 2 schematically illustrate the equilateral quadrangle formed by the pistons 10 articulatedly connected at the corners thereof respectively in two through 45° displaced positions. In FIG. 1 the sides of the quadrangle include angles of 90° with respect to each other, whereas in FIG. 2 the sides of the quadrangle include angles differing from 90° and the position shown in FIG. 2 will depend on constructive limitation, that is, how far the outer radially movable arm portion 3 of the arm means may move inwardly without interferring with each other and how far they can move outwardly while being still properly guided in the bores of the inner arm portions 2. The small circles $E_1$–$E_4$ shown in FIG. 1 and the corresponding small circles $E'_1$–$E'_4$ indicate the axes of the linkage rollers 6 which articulatedly connect the trailing end of one piston to the leading end of the piston adjacent thereto. If FIGS. 1 and 2 are superimposed, as shown at a larger scale in FIG. 3, then eight points of a curve along which the centers of the linkage rollers 6 have to move are derived and an oval outline C may be drawn by drawing a circular arc through the points $E_1$, $E'_1$ and $E_2$, a corresponding arc with the same radius through the points $E_3$, $E'_3$ and $E_4$ and two circular arcs of small radius may also be respectively drawn through the points $E_1$, $E'_4$, $E_4$ and through the points $E_2$, $E'_2$ and $E_3$. The contour of the internal guide surface 20 of the housing can however not be obtained by drawing corresponding circular arcs concentric to the aforementioned arcs. The contour of the internal surface 20 can be obtained by moving one side of the equilateral quadrangle along the aforementioned oval curve C with opposite ends E of this side always on the curve C, by drawing through one of the points E in each position of the latter a radial line passing through the center M of the curve C, that is through the axis of the shaft 1, and a point F on a continuation of the aforementioned radial line and spaced from the point E a distance $a$ will then describe the contour of the internal surface 20. The distance $a$ can be freely chosen within certain limits depending on design limitations, that is on the eccentricity of the axis of the sealing roller 7 from the axis of the linkage roller 6 and on the flattened slide surface of the sealing roller. It will also be noticed from FIG. 3 that during movement of the pistons 10, the points D which correspond to the center of gravity of the pistons will move along a common circle.

The internal combustion engine illustrated in FIGS.

4, 6 and 10, as above described will operate as follows:

When one of the pistons 10 passes the suction passage 33, a gas-air mixture, from a source not shown in the drawing, will enter in the space defined by the outer surface of the piston and the facing portion of the internal surface 20 of the housing and when the piston moves in clockwise direction and the sealing roller 7 connected to the trailing end 10ₜ of the piston passes the right edge, as viewed in FIG. 4, of the suction passage means 33 the gas-air mixture in the chamber 19 defined between the outer surface of the piston and the portion of the internal surface 20 of the housing will be compressed during further movement of the piston in clockwise direction to be finally ignited by the spark plug 43 when the piston moves opposite to the latter. The expanding combustion gases will now drive the pistons and the combustion gases will leave the chamber 19 as the latter opens into the exhaust passage 34. It will be noted that as the piston approaches the exhaust passage 34 the volume of the chamber 19 decreases again so that a proper scavenging of this chamber will be assured. The arm means 2, 3 will transmit the movement of the pistons to the shaft and rotate the latter, and as described above the kinematic of the whole arrangement is made in such a manner that the shaft will be driven with substantially uniform circumferential speed.

Figure 7:
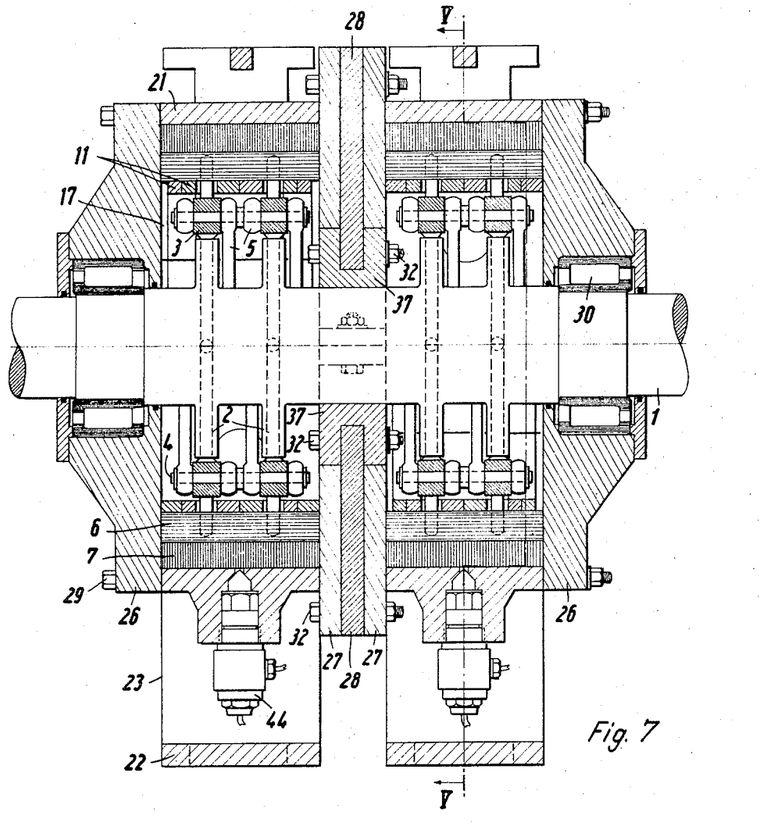
FIG. 7 is an axial cross section taken through the embodiment of FIG. 5, the section being taken along the line VII—VII of FIG. 5.
Figure 8:
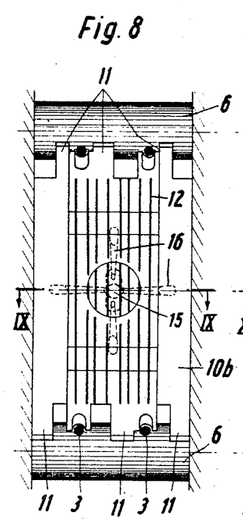
FIG. 8 is an end view of one of the working pistons of the embodiment shown in FIG. 5 the view is taken in direction of the arrow X of FIG. 5.

The embodiment illustrated in FIGS. 6, 7 and 8–11 differs from the above-described embodiment mainly by a different way of cooling of the various elements of the rotary internal combustion engine. A rotary internal combustion engine as illustrated in FIGS. 5, 7 and 8–11 is preferably used for driving a vehicle in which the air stream passing during movement of the vehicle over the engine will cool the outer surface of the housing so that only provisions have to be made for cooling the internal surface of the housing, the pistons and elements associated with the latter. The internal combustion engine illustrated in the aforementioned figures is also shown as a diesel engine and instead of the spark plug 43 shown in the first described embodiment an injection nozzle 44 for injecting fuel oil in finely divided form is provided in the second embodiment. The second embodiment may also differ from this first described embodiment by arranging two sets of pistons in two housings adjacent each other as best shown in FIG. 7, and these housings are preferably displaced relative to each other through 90°.

Each of the housings includes a central section having an inner mantle 21 and an outer mantle 22 and a plurality of cooling ribs 23 extending between the outer surface of the inner mantle and the inner surface of the outer mantle all arranged with respect to each other as described above. Each of the central sections is also provided with a suction passage 33 and a discharge passage 34. The central sections of the two housings are closed at the outer ends thereof by side walls 26 in which roller bearings 30 are arranged for turnably supporting the shaft 1. The side walls are connected to the central sections by screw means 29. Contrary to the first described embodiments, the side walls 26 shown in FIG. 7 are not provided with openings therethrough permitting air to flow in axial direction through the side walls, but the side walls 26 are only formed with a central opening for the shaft and for the bearings 30 which openings are closed at the outer ends by an appropriate cover. The inner side walls 27 of the central sections of the housing are separated by an annular spacer disc 28 sandwiched therebetween. Two short projecting portions of the spacer disc 28 respectively project from opposite sides into the central openings of the side walls 27, which are larger than the diameter of the shaft 10, and a sleeve bearing having two bearing sections 37 are connected by screws 32 to the projecting portions of the spacer disc 28. Similar screws 32 connect the side walls 27 and the spacer disc 28 to each other, and the screw means 29 which connect the outer side walls 26 to the inner mantles of the central sections extend also through corresponding bores in the inner sidewalls 27 and the spacer disc 28 to properly align the latter. The sleeve bearing 37 will support the shaft 1 against vibrations and this sleeve bearing may be easily removed by unscrewing all screws 32 and by turning the bearing through 90° to disconnect it thereby completely from the projecting portions of the spacer disc 28.

While in the first-described embodiment all four pistons are identical, the second embodiment includes likewise four pistons of identical length articulatedly connected to each other in the manner as described in connection with the first embodiment, however, in the second embodiment two of the pistons, that is the pistons 10a are constructed as cooling pistons and the remaining two pistons 10b are actual working pistons.

Figure 5:
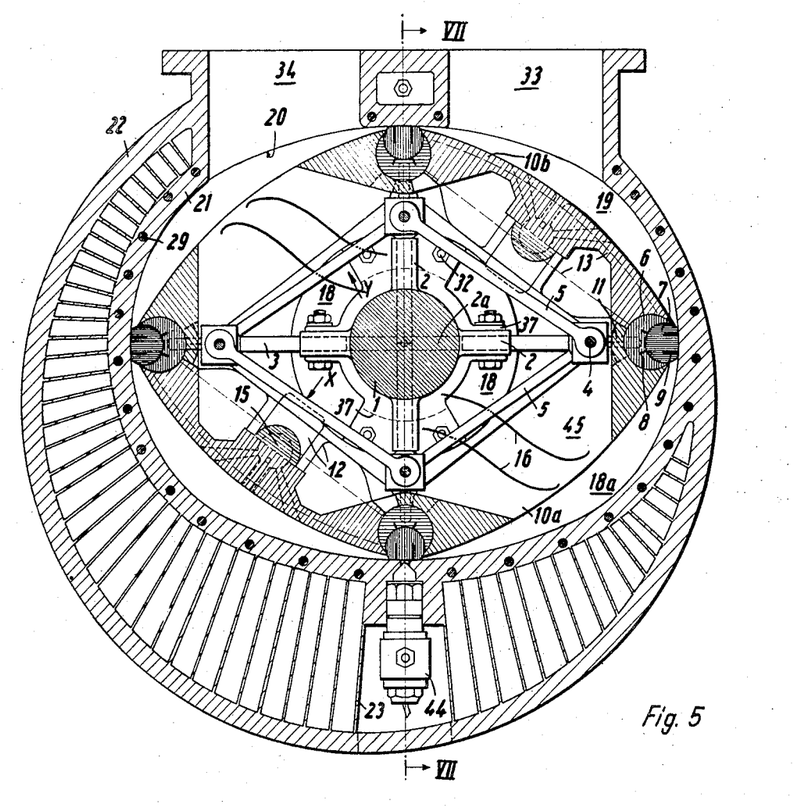
FIG. 5 is a transverse cross section through another embodiment according to the present invention, the section being taken along the line V—V of FIG. 7.
Figure 9:
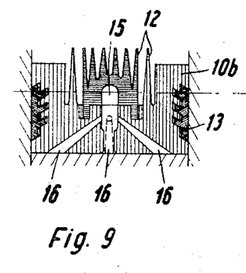
FIG. 9 is a cross section taken along the line IX—IX of FIG. 8.

As mentioned before the second embodiment of a rotary internal combustion engine according to the present invention operates according to the diesel principle and accordingly each of the working pistons 10b is provided with a small chamber 15 which communicates with the working chamber formed between the outer surface of the piston and facing portion of the internal surface 20 of the central housing section through a plurality of channels 16, as best shown in FIGS. 5 and 9. Opposite side walls of the working pistons 10b are provided with sealing strips 13 arranged and connected to the side walls of the working pistons in the manner as described before in connection with the first embodiment. Likewise, each of the working pistons is provided at the inner side thereof with a plurality of cooling ribs 12 arranged between the side walls.

Figure 11:
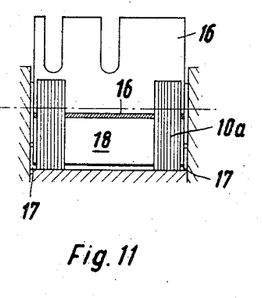
FIG. 11 is a cross section taken along the line XI—XI of FIG. 10.

The cooling pistons 10a do not form with the internal surface 20 of the housing working chambers 19, but the space 18a between the outer surface of each cooling piston 10a and the corresponding portion of the internal surface 20 of the housing communicates through a large opening 45 in each of the cooling pistons with the central portion 18 of the housing. Preferably, two ribs 16 which serve as air deflecting or air ejecting ribs extend spaced from each other transversely through each opening 45 and the deflecting ribs provide air guide surfaces which extend transverse to the movement of the cooling piston to increase during movement of the latter air flow from the space 18a into the central portion of the housing and air flow from the latter through the opening 45 and the discharge passage 44 when the respective cooling piston is arranged in the region of the discharge passage. As best shown in FIGS. 10 and 11 the outer faces of the side walls of each cooling piston 10a are spaced from the corresponding side walls of the housing so as to form spaces 17 between the side walls through which cooling air may also flow.

The pistons 10a and 10b shown in FIG. 5 are articulately connected to each other in the manner as described before by combined sealing and linkage means 6, 7 and the linakge rollers 6 of the combined sealing and linkage means are carried on arm means 2, 3 which are interlinked with each other by bolts 4 and link members 5 in the same manner as described in connection with the first embodiment.

The second embodiment described in connection with FIGS. 5 and 8–11 will operate as follows:

When one of the working pistons 10b passes the suction passage 33 combustion air will be sucked into the working chamber 19 formed between the outer surface of the respective working piston 10b and the internal surface 20 of the central housing section, and during movement of the working piston in clockwise direction the combustion air will be compressed to an increasing extent which reaches its maximum when the working piston moves opposite to the injection nozzle 44. Fuel oil is then injected in finely divided form into the chamber 15 through the injection nozzle 44 and due to the relatively great distance of the chamber 15 from the inner end of the injection nozzle 14, the fuel oil will be sprayed in very finely divided form against the hot walls of the chamber 15 so that very good pre-ignition will occur in the chamber 15. The pre-ignited mixture will stream through the channels 16 out of the chamber 15 in widely dispersed form and intimately mix with the combustion air so that a perfect main combustion will occur during further rotation of the working piston in the working chamber 19. The direction of the fuel injection, the shape of the chamber 15 and the shape and relative arrangement of the channels 16 is made in such a manner to produce in the chamber 15 increased turbulence to assure an intimate mixture of the injected fuel and the combustion air.

When one of the cooling pistons 10a passes the suction passage 33, air which now forms cooling air will pass in the space 18a formed between the outer surface of the cooling piston and the internal surface 20 of the housing and at the same time cooling air will also pass directly through the opening 45 in the cooling piston into the central portion 18 of the housing. During movement of the cooling piston in clockwise direction the outer surface of the cooling piston approaches the internal surface 20 so that air in the space 18a will be forced partly through the opening 45 in the cooling piston and partly through the spaces 17 between the side walls of the cooling piston and of the housing to thereby assure a perfect cooling of the internal surface 20 and the side walls of the housing. Transverse flow of cooling air through the interior of the housing is enhanced by the air deflecting ribs 16, and when the cooling pistons are in the position as shown in FIG. 5 the air compressed in the central part of the housing may flow out through the opening of the cooling piston 10b in the upper left hand portion of the engine, as viewed in FIG. 5, through the discharge passage 34.

It should be noted that the distance between the outer ends of two diametrically arranged inner arm portions 2 is smaller than the diameter of the openings in the inner side walls 27 so that during the disassembly of the engine the shaft 1 with the rigidly attached inner arm portions 2 may be removed in axial direction through the openings of the inner side walls.

It will be understood that each of the elements described above, or two or more together, may also find a useful application in other types of rotary internal combustion engines differing from the types described above.

While the invention has been illustrated and described as embodied in a rotary internal combustion engine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A rotary internal combustion engine comprising, in combination, a housing having an annular central section having an internal surface of oval outline and a pair of side walls connected to opposite ends of said central section;
   a shaft coaxially journalled in and extending into the interior of said housing;
   a plurality of pistons having each a wall portion facing said internal surface of said housing and a trailing end adjacent the leading end of the next following piston;
   combined sealing and linkage means interposed between the trailing end of each piston and the leading end of the following piston and articulatedly connecting the ends of said pistons to each other, each of said combined sealing and linkage means being in sealing contact with the respective piston ends and with said internal surface of said housing;
   and motion transmitting means between said combined sealing and linkage means and said shaft rigidly connected at inner portions thereof to said shaft for rotation therewith and extending outwardly therefrom in at least one plane substantially normal to the shaft axis and carrying said combined sealing and linkage means movable toward and away from the axis of said shaft.

2. A rotary internal combustion engine as defined in claim 1, wherein four pistons of equal length are arranged in said housing so as to form an equalateral linked quadrangle, said combined sealing and linkage means comprising rollers having axes extending substantially parallel to the axis of said shaft and respectively passing through the corners of said quadrangle, and wherein each of said pistons during rotation of said shaft will tilt about its center of gravity, said centers of gravity of said pistons moving during rotation of said shaft along a common circle coaxial with the axis of said shaft.

3. A rotary internal combustion engine as defined in claim 2, wherein the corners of said linked equilateral quadrangle move during rotation of said shaft along successive circular arcs, and wherein a plane normal to the axis of said shaft intersects said inner surface of said housing along a curve described by a point on a line passing through the axis of the shaft and one of said corners and radially outwardly spaced a fixed distance from said one corner during movement of said one corner along said circular arcs.

4. A rotary internal combustion engine as defined in claim 3, wherein said motion transmitting means comprise a plurality of arm means and each of said arm means includes an inner arm portion fixedly secured to said shaft and an outer arm portion slidably connected to said the axis of said shaft, said rollers being respectively connected to the outer arm portions of said arm means.

5. A rotary internal combustion engine as defined in claim 4, wherein each of said arm means extends in substantially radial direction away from said shaft, said rollers being respectively fixedly connected to the outer free ends of said outer arm portions.

6. A rotary internal combustion engine as defined in claim 5, wherein a plurality of arm means are connected to each of said rollers spaced in direction of the axis of each roller from each other, and including a bolt extending substantially parallel to the axis of the respective roller and connecting the outer arm portions of said plurality of the arm means for each roller to each other.

7. A rotary internal combustion engine as defined in claim 5, and including at least four link members of equal length respectively articulatedly connected at opposite ends thereof to said outer arm portions of said arm means.

8. A rotary internal combustion engine as defined in claim 6, and including a plurality of link members each formed with a pair of bores respectively located in the region of opposite ends of each link member, the distance between said bores being the same for all of said link members, and said bolts extending respectively through said bores of said link members.

9. A rotary internal combustion engine as defined in claim 1, wherein each of said combined sealing and linkage means comprises a linkage roller carried by motion transmitting means and being interposed between correspondingly curved faces at the ends of the respective pair of pistons, and a sealing roller of smaller diameter than said linkage roller, said sealing roller being eccentrically mounted in said linkage roller and being in sealing contact with said internal surface of said housing, the centers of said rollers being located on a straight line intersecting the axis of said shaft.

10. A rotary internal combustion engine as defined in claim 9, wherein said sealing roller has a slide face in sliding engagement with said internal surface, said slide intersecting in a plane normal to the axis of said sealing roller the circular contour of the latter along a straight line outwardly spaced from the axis of said sealing roller.

11. A rotary internal combustion engine as defined in claim 10, and including a pair of sealing strips for each sealing roller respectively slidably arranged in guide slots of the latter and having outer edges in sealing contact with said internal surface of said housing.

12. A rotary internal combustion engine as defined in claim 9, and including a pair of sealing strips slidably guided in guide slots extending in longitudinal direction of said linkage roller and respectively engaging along the outer edges thereof a peripheral surface of the sealing roller eccentrically mounted in the linkage roller.

13. A rotary internal combustion engine as defined in claim 1, wherein each of said combined sealing and linkage means comprises a roller having an axis substantially parallel to the axis of the shaft, and each of said piston ends being provided with a plurality of comb-like arranged fingers partially extending about the peripheral surface of said roller in engagement therewith, the fingers on the end of one piston being axially displaced with respect to the fingers on the adjacent end of the following piston so that the fingers on the adjacent ends of two pistons may move in between each other.

14. A rotary internal combustion engine as defined in claim 1, wherein each of said pistons has a pair of opposite side walls respectively facing inner faces of the side walls of the housing and including sealing means respectively interposed between the outer faces of the side walls of said piston and inner faces of said side walls of the housing, each of said pistons being formed with a plurality of grooves extending inclined to the side faces thereof into said piston, each of said grooves having a bottom face closer to the axis of said shaft than the outer end of each groove, and each of said sealing means being provided with a plurality of ridges respectively guided in said grooves so that said sealing means is, during movement of said piston along said internal surface of the housing, pressed by a centrifugal force against the inner face of the respective side wall.

15. A rotary internal combustion engine as defined in claim 1, wherein each side wall of said housing is formed with an opening therethrough, and including fan means having substantially radial blades connected to said shaft for rotation therewith, arranged adjacent one side wall of said housing and constructed to suck air in axial direction through said openings in said side walls.

16. A rotary internal combustion engine as defined in claim 15, wherein said central section of said housing includes an inner mantle, the inner surface of which forms said internal oval surface, and an outer mantle radially spaced over a major part thereof from said inner mantle to form between the outer surface of said inner mantle and the inner surface of said outer mantle axially extending air passage means, and air guide means connected to said housing for guiding air sucked by said fan means in axial direction through said openings in said side walls through said air passage means between said inner and said outer mantle.

17. A rotary internal combustion engine as defined in claim 16, and including a plurality of cooling ribs extending spaced from each other in substantially radial direction between said outer surface of said inner mantle and the inner surface of said outer mantle.

18. A rotary internal combustion engine as defined in claim 1, wherein said central section of said housing includes an inner mantle having an inner surface forming said internal oval surface and an outer mantle substantially in the form of a circular hollow cylinder having an axis substantially parallel to the axis of said shaft and eccentrically arranged with respect to the latter so as to form between the outer surface of said inner mantle and the inner surface of said outer mantle axially extending air passage means, suction passage means extending through said mantles to communicate during rotation of said shaft and said pistons connected thereto successively with the space between the outer surface portion of each piston and said internal surface of said housing, said internal surface of said housing being during operation of said engine coolest in the region of said suction passage means and hottest at the portion thereof spaced angularly in direction of rotation of said shaft from said inlet passage means, and said outer mantle being arranged with respect to the inner mantle so as to merge with the latter in the region of said coolest portion and to be spaced farthest from said inner mantle in the region of the hottest portion of the latter.

19. A rotary internal combustion engine as defined in claim 1, wherein said engine includes a pair of oppositely arranged working pistons and a pair of oppositely arranged cooling pistons intermediate said working pistons, each of said cooling pistons being formed with an opening in a central part of said wall portion thereof.

20. A rotary internal combustion engine as defined in claim 19, and including suction passage means and discharge passage means successively communicating with the space between said wall portions of each piston and said internal surface of said housing during movement of said pistons along said internal surface for sucking cooling air and combustion air into the respective spaces of said cooling pistons and said working pistons and for discharging heated air and hot combustion gases respectively from said spaces, said cooling air passing from said suction passage through said opening in said wall portion in one of the cooling pistons into a central portion of the housing and in heated state through the opening in the other of said cooling pistons into said discharge passage.

21. A rotary internal combustion engine as defined in claim 19, and including air deflecting ribs on each of said cooling pistons extending through said opening and transverse to the movement of the cooling piston.

22. A rotary internal combustion engine as defined in claim 19, wherein each of said cooling pistons has side walls respectively facing and being spaced from said side walls of said housing.

References Cited

UNITED STATES PATENTS

| | | | |
|---|---|---|---|
| 716,970 | 12/1902 | Werner | 123—16 |
| 1,427,692 | 8/1922 | Mahon. | |
| 2,382,259 | 8/1945 | Rohr | 123—16 |
| 3,196,854 | 7/1965 | Novak | 123—8 |

RALPH D. BLAKESLEE, *Primary Examiner.*